Aug. 26, 1952   T. A. FEENEY ET AL   2,608,104
THROTTLE SYSTEM FOR JET ENGINES

Filed April 27, 1948   5 Sheets-Sheet 1

INVENTORS
THOMAS A. FEENEY
CHARLES E. OATES
ALVIN R. VOGEL
BY Herbert E. Metcalf
Attorney

Aug. 26, 1952   T. A. FEENEY ET AL   2,608,104
THROTTLE SYSTEM FOR JET ENGINES
Filed April 27, 1948   5 Sheets-Sheet 2

INVENTORS
THOMAS A. FEENEY
CHARLES E. OATES
ALVIN R. VOGEL
BY Herbert E. Metcalf
Attorney Aug. 26, 1952     T. A. FEENEY ET AL     2,608,104
THROTTLE SYSTEM FOR JET ENGINES
Filed April 27, 1948     5 Sheets-Sheet 4

INVENTORS
THOMAS A. FEENEY
CHARLES E. OATES
ALVIN R. VOGEL
BY Herbert E. Metcalf
Attorney Aug. 26, 1952 T. A. FEENEY ET AL 2,608,104
THROTTLE SYSTEM FOR JET ENGINES
Filed April 27, 1948 5 Sheets-Sheet 5

INVENTORS:
THOMAS A. FEENEY
CHARLES E. OATES
ALVIN R. VOGEL
BY Herbert E. Metcalf
ATTORNEY Patented Aug. 26, 1952

2,608,104

UNITED STATES PATENT OFFICE 2,608,104

THROTTLE SYSTEM FOR JET ENGINES

Thomas A. Feeney, Los Angeles, Charles E. Oates, Gardena, and Alvin R. Vogel, Los Angeles, Calif., assignors to Northrop Aircraft, Inc., Hawthorne, Calif., a corporation of California Application April 27, 1948, Serial No. 23,568

11 Claims. (Cl. 74—471)

This invention relates to airplane engine controls, and, more particularly, to throttle control systems for airplanes equipped with a jet propulsion engine or a plurality thereof.

Many modern airplanes, particularly those used in military service, are now being propelled by the jet of hot gases issuing from a gaseous combustion turbine known as a turbo-jet, wherein air compressed by a compressor is heated in a combustion chamber by burning fuel, the heated air rotating a turbine coupled to the compressor. Used as a turbo-jet, only enough power is extracted from the gas by the turbine to drive the compressor, the remaining hot expanding gas being exhausted rearwardly to produce a propelling thrust on the airplane.

Such engines, when used for airplane propulsion, provide operating characteristics wholly different from those inherent in the operation of reciprocating engines formerly used to drive airplanes by means of rotating propellers. In consequence, an airplane throttle system used to control the turbo-jet engines whose thrust in turn propels the airplane, should be designed to not only conform to characteristics peculiar to this type of engine, but also to the flying characteristics of a jet propelled airplane.

In addition, several large airplanes today utilize a plurality of turbo-jet engines, the largest number at present being eight General Electric TG-180 turbo-jets as utilized to drive the U. S. Army bomber type YB-49. This aircraft is an all-wing airplane with a 172 ft. span and a 53 ft. length, having an all up weight of about 200,000 lbs. Throttling problems are still further complicated in a throttle system for such a large number of engines in that all engines must be accelerated and decelerated uniformly and in complete accordance with both engine and airplane requirements at various altitudes.

In the design of any airplane speed control system, there are a number of functional characteristics of that system that must be made acceptable to the requirements of the desired engine-airplane functions.

Several of the more important characteristics of a suitable throttle system will now be defined.

"Sensitivity" is the ratio of output effect to input signal. The input signal may be of any nature, such as a mechanical displacement, electrical voltage, hydraulic or pneumatic pressures. In the case of throttle controls for airplanes, sensitivity is normally measured in terms of miles per hour change in airspeed (at constant altitude) per inch of throttle control knob motion.

One of the main problems encountered with respect to sensitivity, using turbo-jet engines and considering airplane weights, altitudes, airspeed, etc., is that a very great change in airplane speed per degree of engine throttle shaft rotation occurs at critical conditions.

This is basically due to the fact that the engine thrust does not increase in a linear relation to R. P. M., and in most turbo-jet engines the engine fuel control system is set up to give a linear relation of throttle shaft angle relative to R. P. M.

For example, in reference to the particular airplane YB-49, mentioned above, on which the present invention has been utilized, with the landing flaps and landing gear extended, and wing slots open, it was found that a change in airspeed from maximum to landing speed could be accomplished by rotating the throttle control shaft on the engine through an angle of only 1.75 degrees out of a total of approximately 65 degrees available. When it is considered that the normal internal backlash in an engine control system can be expected to be anywhere from ½ degree to 2 degrees, the basic difficulties involved in obtaining proper sensitivity becomes quite obvious.

"Time required for full operation" is rather self-evident, meaning the minimum (or maximum) amount of time to be allowed in moving a given control from one extreme position to the opposite extreme position.

Concerning the time required for full operation of a throttle control for jet engines driving aircraft, three throttle velocity requirements present themselves. The first is that there is a maximum speed of throttle shaft operation for a particular engine above which the engine becomes subject to either excessive tailpipe temperatures, or burner blowout, or compressor stall.

For the TG-180 turbo-jet engines, for example, the time required to move the engine throttle shaft from a position corresponding to sea level idling R. P. M., to full open without subjecting the tailpipe to excessive temperatures is about 25 seconds. It was found by experiment that a pilot or flight engineer, by being very careful, could manually move a throttle handle knob at about one-half inch per second or one inch per second without difficulty. Using this latter figure, the throttle knob would require a travel of 25 inches, or a little over 2 feet, to meet the 25 second requirement if manually operated.

The second requirement is that it should be possible to operate the throttle very rapidly during the engine starting procedure.

The third requirement is that it should be possible to advance the engine throttle from a position corresponding to 50% thrust to full thrust, in not more than four seconds in the YB-49 engines. This is to allow rapid applications of thrust during balked landings.

"Minimum increment of control" is the smallest effect that can be produced at the output end as a result of any unidirectional input signal. For airplane throttle control systems, this characteristic is measured in terms of miles per hour change in airspeed, again at constant altitude.

In addition to the above problems, it is to be noted that the minimum operable engine speeds in jet engines are relatively high, particularly at high altitudes. If this fact is neglected, it becomes possible for the pilot to inadvertently kill his engines at altitude by setting his throttles at a position corresponding to less than minimum operable speed at that altitude.

With the above points in mind, the objects of this invention are: to provide a throttle control system for a single or multiple engine jet propelled airplane wherein satisfactory sensitivity is obtained at flight conditions where sensitivity is important, and thus also obtaining an acceptable minimum increment of control; to provide a throttle control system wherein the speed of control lever motion can be limited so as to prevent excessive tailpipe temperatures and burner blowouts, while at the same time allowing rapid motion of any one throttle handle, through the full range of travel for starting and run-up purposes; to provide a throttle control system wherein advantage is taken of the maximum allowable engine throttle shaft velocities at low altitudes, to permit faster applications of thrust occasionally necessary during landing approaches; and to provide a throttle control system wherein throttles can be retarded without inadvertently retarding below minimum operable speed corresponding to maximum altitude, and at the same time making it possible to close the throttles completely in order to shut down the engines by cutting off the fuel supply when desired.

This invention possesses numerous other objects and features of advantage, some of which, together with the foregoing, will be set forth in the following description of specific apparatus embodying and utilizing the novel means of the present invention. It is, therefore, to be clearly understood that it is not limited, in any way, to the apparatus of the present application, as various other apparatus embodiments, utilizing the invention, within the scope of the appended claims, may be adopted.

Considered in broad terms for multiple engine operation, the apparatus of this invention comprises a directly connected throttle control cable system between a flight engineer and one or more jet engines, which may, at will, be engaged with individual electric motor drive systems to limit the speed of throttle shaft movement. This motor-driven system preferably uses a cylindrical cam with a follower which drives each throttle handle, the cam being designed to allow a proper speed of throttle operation at every throttle position. To permit faster throttle operation at low altitudes, a pilot control switch is provided which speeds up each driving motor to three times the velocity of normal operation. The electrical control system provides limit switches which will shut off the motor drive systems when the engines have been slowed to the minimum operable speed at maximum altitude. The flight engineer's group of individual throttle handles for one complete side of the airplane is preferably mounted on a shaft which is directly connected to a pilot's throttle handle for that same side, the arrangement being such that the pilot can simultaneously control the engines on one side of the airplane, and with two such controls can throttle all of the engines simultaneously. The electrical equipment is so connected that normal control may be assumed by either the pilot or flight engineer. For high speed operation of the throttles, however, the pilot may be given priority over the flight engineer. The flight engineer can throttle each engine manually or through the electrical drive system, while the pilot normally throttles four engines or eight at a time, by means of the electrical drive system only, combined with a mechanical follow-up system to be described later in detail. In order to allow the pilot to control the throttles directly in event the electrical system should become inoperable, an emergency disengagement feature is provided which gives him direct manual control through the follow-up system.

For a smaller number of engines the flight engineer's handles may become pilot's handles and the connected pilot control dispensed with.

The present invention may be more fully understood by direct reference to the drawings, wherein.

Figures 10, 11:
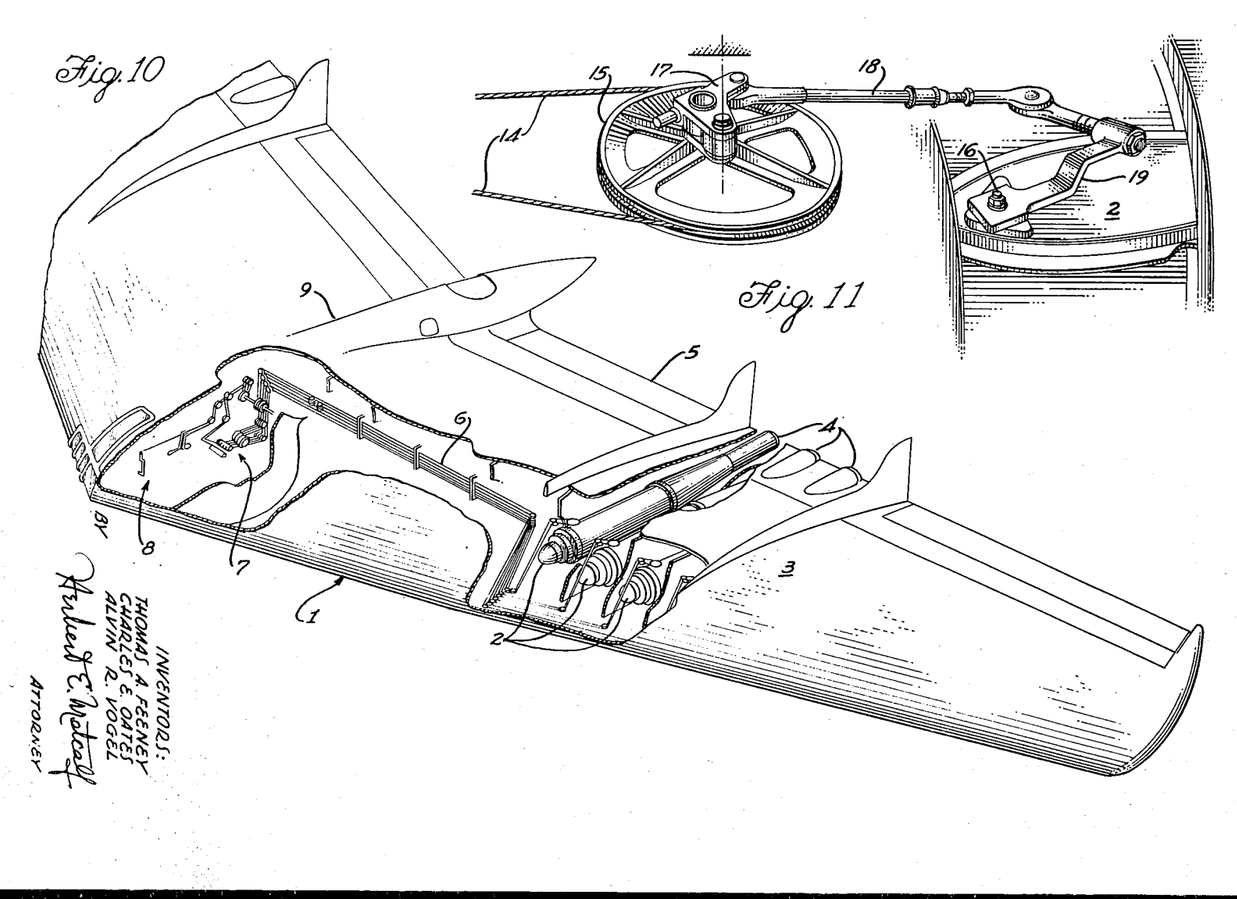
Figure 10 is a perspective view of the upper left side of an all-wing airplane using jet engines, showing the present throttle system connected from the flight compartment to the engines on this side.
Figure 11 is a perspective detail, on an enlarged scale, showing the throttle connecting linkage at one engine.

Referring to the drawings, and first to Figure 10, an airplane 1 is provided with a plurality of jet engines 2 located side by side in the left wing panel 3. The engines 2 each terminate at the aft end in a tail pipe 4 emerging from the wing trailing edge 5, from which the high-velocity combustion gases are directed to furnish thrust for propelling the airplane 1. A similar engine installation is provided in the right wing panel (not shown).

The throttles of the engines 2 are connected by a throttle control system 6 to various controls at the flight engineer's station 7 and pilot's station 8 in the crew nacelle 9.

Figure 1:
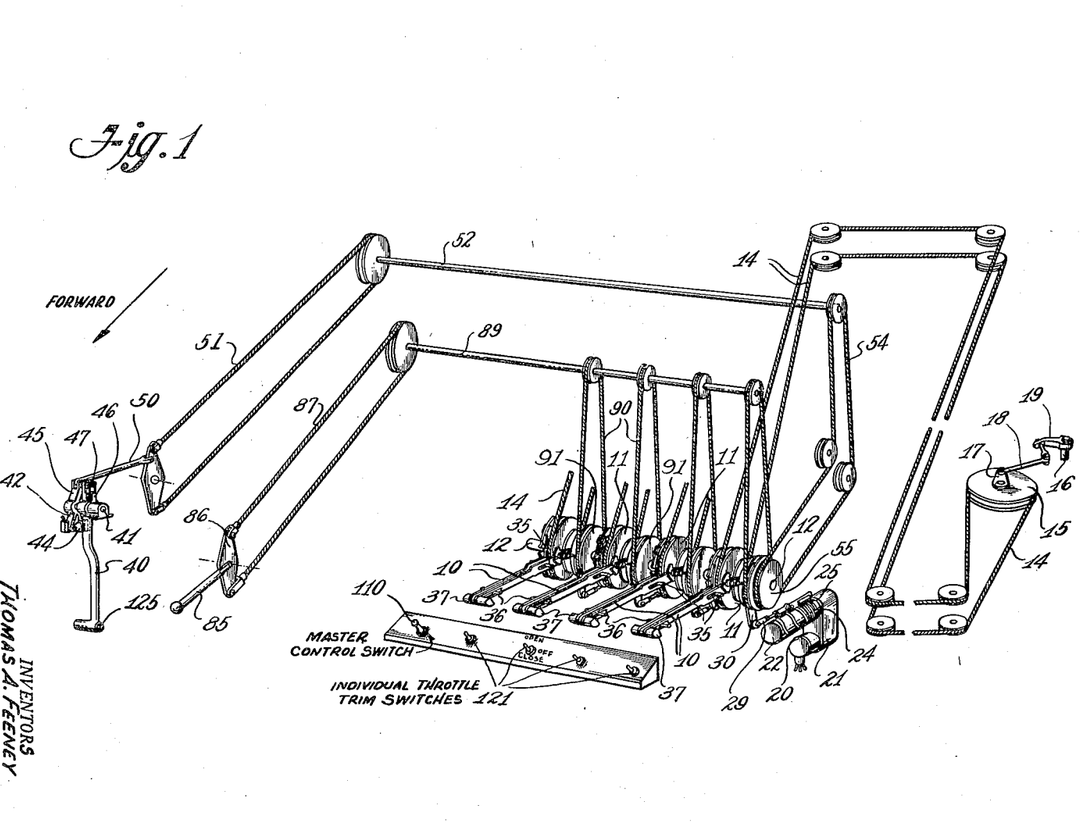
Figure 1 is a perspective schematic diagram showing the major parts of a preferred throttle control system for the engines on one side of the airplane only. The system for the other side is independent and similar, but installed in opposite relationship.

A detailed description of the throttle control system 6 will now be given. As shown in Figure 1, the flight engineer is provided with a throttle control handle 10 for each of the four engines on one side of the airplane. A throttle cable pulley 11 is solidly attached to the lower end of each throttle handle 10, and the whole is mounted to rotate freely on a torque shaft 12 on which the four throttle control handles are mounted, so that each throttle control handle 10 rotates about the center of the cable pulley 11. A cable 14, placed around the pulley 11 leads to and around a cable wheel 15 near the throttle control shaft 16 of the engine being controlled by the particular handle (Figure 11). A crank arm 17 on this cable wheel 15 is connected by a push-pull rod 18 to an engine throttle lever 19 clamped to the engine throttle control shaft 16. The linkage at the engine throttle is preferably adjustable to provide equal throttle handle travel on all handles. Thus, by moving the flight engineer's throttle control handle 10 forward or backward, the engine throttle will be opened or closed manually and directly.

Figure 2:
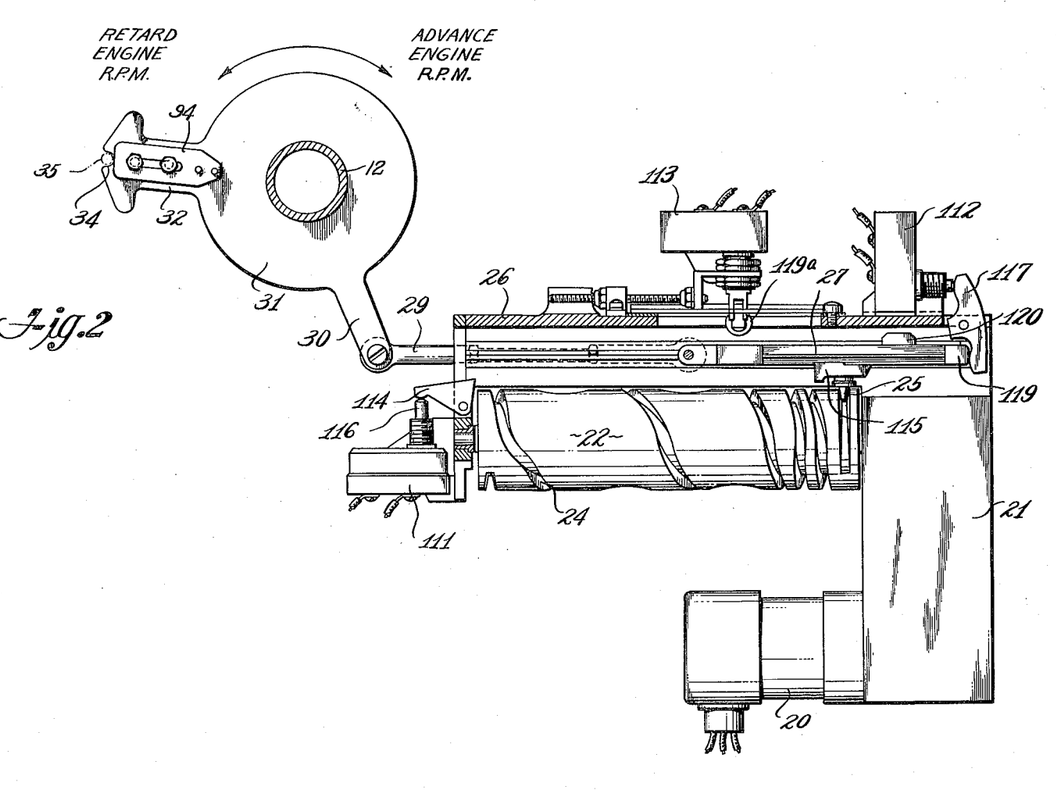
Figure 2 is a side view on a scale larger than that of Figure 1 showing in schematic form the motor-driven system and position limit switches for one throttle.

In addition to the manual control just described, each throttle handle 10 may be moved electrically by mechanical engagement with a motor-driven system as shown in Figure 2. This electrical control is not used as a power boost, but solely as a speed regulating means. A small 24-volt D. C. reversible motor 20 for example, is installed near the throttle handle 10 for which it is intended to be used. Each throttle handle at the flight engineer's position is so equipped. This motor 20 drives gears in a gear box 21 which in turn revolve a cylindrical cam 22 mounted horizontally and pointing fore-and-aft, at about 9 R. P. M. The cam 22 has a spiral groove 24 cut in its surface, into which fits a follower 25 that is free to move fore-and-aft in a slide assembly frame 26 mounted above the cam 22. The follower 25 is part of a sled assembly 27 which has a push-pull operating rod 29 connected to its forward end. This rod 29 is then connected to the lower leg 30 of an arm assembly 31 mounted on the throttle handle torque shaft 12. Arm assembly 31 can rotate freely on the torque shaft 12.

A motor-driven arm 32 of the arm assembly 31 projects outwardly adjacent the side of a throttle control handle 10. This arm is provided with a slot 34 at the end thereof to receive an engagement pin 35 mounted crosswise in the throttle control handle 10 and spring-loaded in a downward direction. The pin 35 may be lifted against the action of the enclosed coil spring (not shown) by a finger lever 36 under the throttle control handle knob 37 (see Figure 1).

When the throttle control handle 10 is engaged with the motor-driven arm 32, manual operation of the throttle cannot be accomplished, but by running the motors 20 each throttle is advanced or retarded at a definite rate corresponding to the motion imparted to the follower 25 by the cam groove 24.

The particular cam shown has the cam groove 24 contoured for control of the TG–180 turbo-jet, with closely spaced turns near the retard end of the cam, followed by wider spaced turns near the advance end of the cam to provide different rates of throttle movement. A preferred range of rates within the extent of throttle movement will be given later. Each throttle drive motor 20 is preferably equipped with a magnetic brake for fast stopping when the motor is de-energized.

When the throttle control handle 10 is disengaged from the arm assembly 31, the throttle may be manually operated at any speed, throughout its entire range of travel. This disengagement feature enables the flight engineer to shut down the connected engine or engines in case of emergency without affecting the normal electrical control of any others that may also be mounted on torque shaft 12. This disengagement also enables rapid manual throttle operation desirable during engine starting and run-up procedures.

The various switches involved in the operation of motors 20 will be described later.

In case only one or a few engines are to be controlled, the system as so far described, when equipped with the proper switches and connections, would be such that one or more of the throttle handles 10, thus far described as being operable by the flight engineer, can be operated directly by the pilot without a flight engineer. In this case torque shaft 12 would become merely a mounting axle. However, when two or more engines are to be simultaneously controlled on each side of the airplane, the torque shaft is utilized as a means whereby all of the throttles on one side of the airplane can be operated in unison either under power or mechanically by a single pilot throttle handle.

Figures 3, 4, 5, 6:
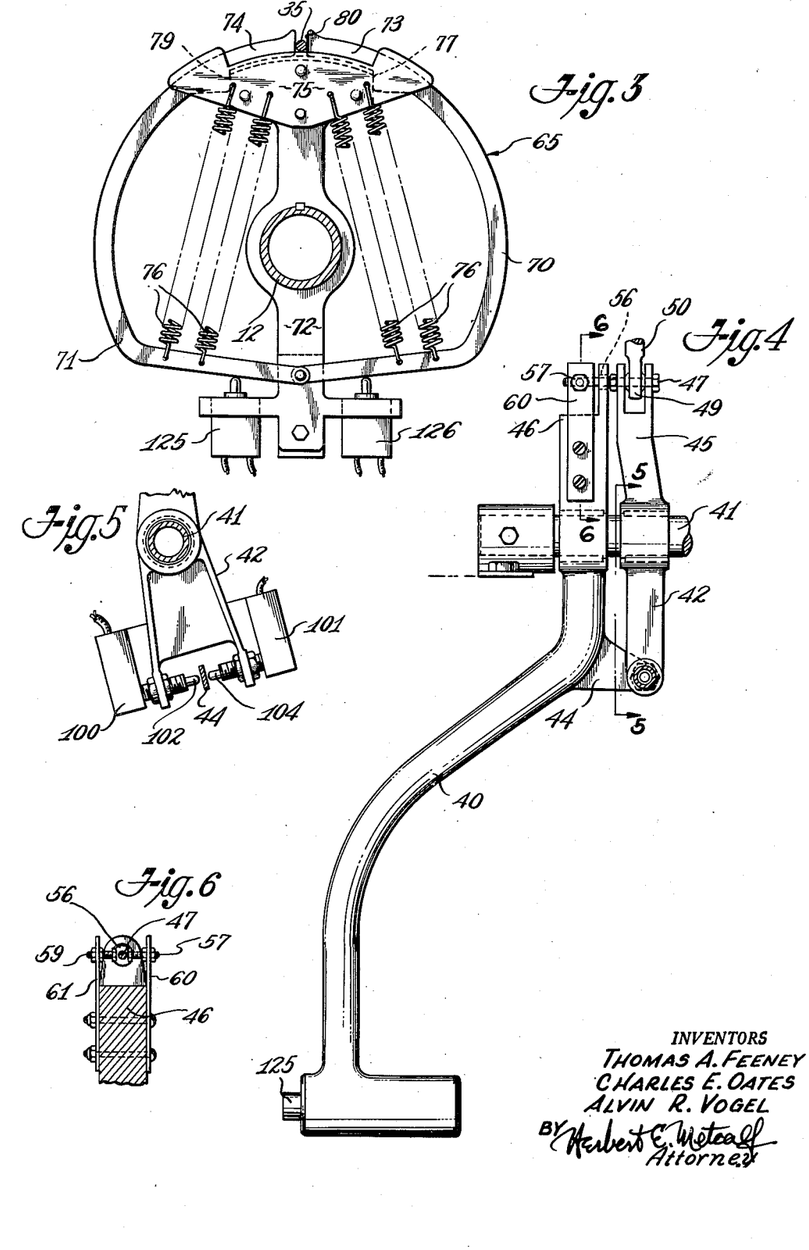
Figure 3 is a diagrammatic side view showing one spring and switch assembly, which spring-connects a throttle handle to the flight engineer's torque shaft.
Figure 4 is a diagrammatic view looking forward, showing the pilot's left hand throttle and control switch support.
Figure 5 is a cross-sectional view of the switch support taken as indicated by the line 5—5 in Figure 4, showing the installation of the pilot's throttle control switches.
Figure 6 is a schematic cross-sectional view of the upper end of the pilot's throttle handle taken as indicated by the line 6—6 in Figure 4, showing the connection thereof.

This is accomplished from a mechanical standpoint, as shown in Figures 1 and 3–9 inclusive. A pilot's handle 40 is free to rotate on a pilot shaft 41 in a convenient position for the pilot to reach and operate (Figures 1 and 4). Also free to rotate on shaft 41, alongside of pilot handle 40, is a switch support 42 carrying switches operable on motion of the pilot handle, through a handle lug 44, these switches being later described. Switch support 42 is linearly extended to form a push rod fitting 45 on the other side of the shaft 41, parallel to a similar extension 46 on the throttle handle. Push rod fitting 45 holds a drive bolt 47 on which the end 49 of a pilot push rod 50 is mounted, this pilot push rod 50 rotating torque shaft 12 through a cable link 51, pilot shaft 52, torque shaft cable 54 and torque shaft pulley 55 (Figure 1).

Switch support 42 is moved by movement of the pilot handle 40 or vice versa, by extending the bolt 47 through a bolt hole 56 in which clearance is provided. Prior to take-up of this clearance by movement of pilot throttle handle 40, the pilot throttle handle 40 is centered on bolt 47 by adjustable stops 57 and 59 mounted on spring supports 60 and 61 respectively (Figure 6), on each side of pilot handle extension 46.

The spring supports 60 and 61 on the pilot handle are strong enough to move the handle 40 without taking up the clearance in bolt hole 56 so that when push rod 50 is moved, the pilot handle will move in accordance with push rod movement. However, the spring supports are not strong enough to overcome torque shaft resistance so that the pilot handle can be moved within the limits imposed by the bolt hole clearance without moving push rod 50. After this clearance has been taken up, the pilot handle can be used to move push rod 50 to rotate torque shaft 12 in an emergency, as will be explained later.

Figure 9:
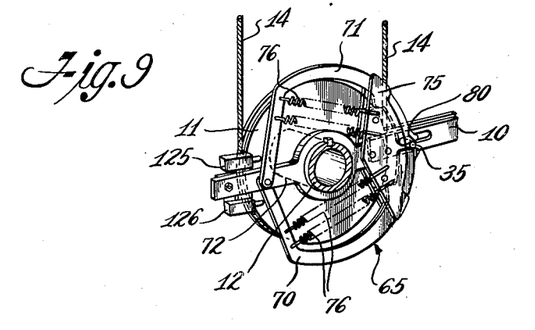
Figure 9 is a diagrammatic perspective view of the other side of a throttle cable pulley.

Having connected the pilot throttle handle 40 to torque shaft 12 in order for the pilot throttle handle to mechanically move with rotation of the torque shaft 12, it is necessary to connect the torque shaft 12 with each flight engineer's throttle handle 10. This is done by a spring assembly 65 connecting, as desired, each handle 10 with the torque shaft 12. One of these assemblies is shown in Figures 3 and 9.

The spring assembly 65 for each throttle handle 10 consists of two segments 70 and 71 hinged at their bottom ends to a spring quadrant 72 keyed to the torque shaft 12. The segments 70 and 71 are partly semi-circular in shape, one encircling the front side of the torque shaft and the other encircling the rear side. The top ends 73 and 74 of the respective segments are pulled together, between guide plates 75 attached to quadrant 72, by preloaded tension springs 76 connected from the lower parts of the segments 70 and 71 to a plate 75, and are stopped by segment shoulders 77 and 79, while still a slight distance apart, so as to form a slot 80 between the two. It is by means of this slot 80 that the control handle engagement pin 35 connects the handle to the spring assembly 65. From this it can be seen that when the control handle engagement pin 35 is engaged with slot 80 and also with slot 34 in arm 32 operation of the connected throttle motor will, in moving the throttle handle 10, force one of the spring segments 73 or 74 to rotate outwardly at the top, stretching the connected springs 76 and tending to rotate the torque shaft 12. The engaged throttle handle 10 will also be constrained to move with any rotation of the torque shaft 12. The latter movement is made possible by the fact that the spring preload is greater than that required to overcome system operating loads.

The mechanical connections so far described permit the individual engines to be throttled directly and separately by the flight engineer, with handle pins 35 disengaged. Under these conditions, spring assemblies 65 are not connected to the handles 10, so no follow-up is imparted to the pilot throttle handle 40. This condition will exist during the starting of the four engines by the flight engineer with direct manual control of the engines. After the engines are started and idling properly, the pins 35 are engaged both in the cam drive slot 34 and in the spring assembly slot 80. Thereafter, when motors 20 are driven, either by flight engineer or pilot operation of various motor switches (yet to be described), the single pilot handle will follow up the simultaneous throttle movements as tied together by torque shaft 12. The position of the pilot handle will indicate the average position of the four throttles.

Figure 7:
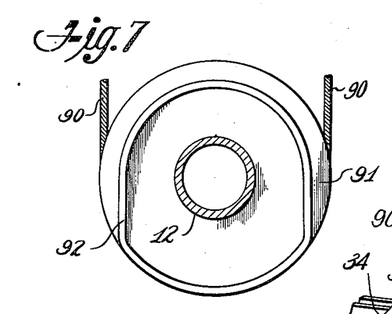
Figure 7 is a side view schematically showing one emergency disengaging cam on the flight engineer's torque shaft.
Figure 8:
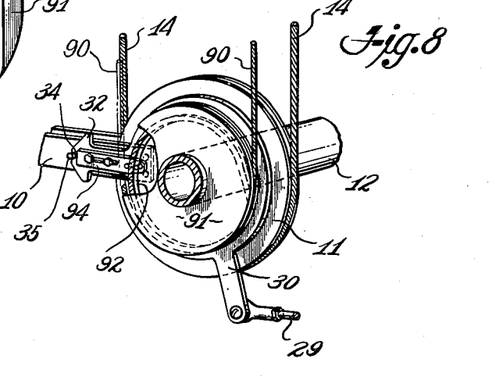
Figure 8 is a diagrammatic perspective view of one side of a throttle cable pulley.

To provide the pilot with a direct mechanical control of the four throttles in an emergency, an emergency disengagement lever 85 is located within reach of the pilot for the purpose of disengaging the flight engineer's throttle control handles from the motor-driven system, this lever controlling the four throttles on one side of the airplane as shown in Figures 1, 7 and 8. The pilot lever 85 operates a crank assembly 86 which connects by cables 87 to an emergency shaft 89 connected by additional cables 90 to four disengaging pulleys 91 mounted on the torque shaft 12 between each throttle cable pulley 11, as shown in Figure 1.

Referring to Figures 7 and 8, each disengaging pulley 91, is free to rotate on the torque shaft 12, and each one controls the disengagement of one throttle handle 10 from its associated arm assembly 31. A cam 92 is attached to the disengaging pulley 91, so that, when rotated, it will lift a slide 94, mounted on the upper leg 32 of the arm assembly 31 in such a way as to push the handle engagement pin 35 out of the slot 34 in the upper leg 32 of arm assembly 31. However, the throttle handle engagement pin 35 remains engaged with the spring assembly 65 mounted on the torque shaft 12, because the spring assembly slot 80 is made longer than slot 34 on the arm assembly 31. Therefore, should the electrical system fail, the pilot can move the emergency disengaging lever 85 downwardly (an angular movement requiring in the neighborhood of 80 degrees), which disengages the electrical system to allow him to simultaneously throttle all four engines directly, through his throttle control handle 40, torque shaft 12, spring assemblies 65, and individual flight engineer's throttle handles 10. In this condition of the system the engineer may also manually throttle the four engines simultaneously by using any one throttle handle. When the pilot returns lever 85 to normal position the cam 92 returns slide 94 to initial position and handle spring, acting on pin 35, pushes pin 35 down so that it can be again engaged with the motor driven arm 32.

Having described the mechanical linkages possible in the throttle system, a description of the electrical system will next be given.

After the engines have been started by manual control, and assuming that all engines are idling properly, all of the engagement pins 35 in the flight engineer's throttle handles are engaged in arm assembly slots 34 and in spring assembly slots 80 with the pilot's disengagement lever 85 in electrical operating position.

It is possible to engage both the spring assembly 65 and the arm assembly 31 on each handle only when the slots therein are directly opposite each other. Such a position is always possible after the system is first installed, unless a motor is operated while the throttle handle 10 is disengaged, in which case it can be easily corrected. When pins 35 are all engaged, the system is ready for electrical operation either by the flight engineer or the pilot by various switches next to be described.

Referring first to Figures 4 and 5, as pointed out above, the pilot throttle control handle 40 and the switch support 42 rotate simultaneously about the pilot shaft 41, except for the intentional amount of play allowed between the connection bolt 47 and the bolt hole 56 in the throttle handle 40. This play is utilized to enable the operation of the pilot's throttle control switches without moving push rod 50, as follows: an advance control switch 100 and a retard control switch 101 of the spring loaded micro type are mounted on the lower end of the switch support 42 so that their respective switch plungers 102 and 104 face each other a small distance apart. Fitting into this space between the switch plungers is the flat lug 44 which, as stated above, is part of throttle control handle 40. The handle lug 44 is held centered between the two switch plungers by the two spring supports 60 and 61. The switches 100 and 101 are then adjusted to be actuated when the throttle handle 40 is pushed, or pulled, before the play in the bolt hole 56 is taken up but not when lug 44 is centered. Since the pilot's switch support 42 is connected directly to the throttle torque shaft 12 at the engineer's station, the pilot's throttle handle 40 always assumes the same relative position as the torque shaft 12, which represents the average throttle setting of the four engines on one side of the airplane, but when moved by the torque shaft neither switch is operated due to the centering action of spring supports 60 and 61. However, at any position of the throttle handle 40, either switch can be operated by pressure by the pilot on the handle in the desired direction. The advance control switch 100 and retard control switch 101 are electrically connected to operate, simultaneously and uniformly, the motors 20, driving the four flight engineer's throttle handles in the direction as determined by pilot pressure. The speed of the motors can readily be adjusted for example, by means of variable resistors mounted in an electrical panel at the flight engineer's position. The pilot handle then follows the motion imparted to the flight engineer's throttles and torque shaft by the motors, but only at rates permitted by cam rotation.

At the flight engineer's station, the flight engineer is provided with a flight engineer's master control switch 110 connected to the motors 20 to advance or retard all eight engine throttles simultaneously, again at a rate of speed as controlled by the slope of cam grooves 24, subject to operation of several motor-driven sled operated switches as shown in Figure 2. Three limit switches are actuated by each motor-driven sled assembly 27: an advance switch 111, retard switch 112, and an idle limit switch 113. In the extreme forward position of the cam follower 25, the advance limit switch 111 is actuated by advance lever 114 which is contacted by a projection 115 from the bottom of the sled 27. This advance switch 111 is wired in the circuit which is in operation when the throttle is being opened. The advance switch 111 is spring-loaded and normally remains in the closed condition. When the advance switch plunger 116 is moved inwardly against the enclosed spring (not shown), as when actuated by projection 115 on the moving sled 27, the electrical circuit is broken and the motor 20 is thus stopped at the throttle open position.

In the rear-most position of the cam follower 25, the retard limit switch 112, identical in action to the advance limit switch 111, except that it is in the retard circuit, is actuated by a retard lever 117 which is contacted by the rear end 119 of the sled assembly 27. Thus, when the throttle reaches the full closed position, the retard limit switch 112 breaks or opens the motor circuit.

The idle limit switch 113, similar to the above described limit switches, is adjustably mounted, with a roller plunger 119a pointing downwardly, in the slide frame 26 above the sled assembly 27. This idling switch 113 is actuated by a bevel-cornered boss 120 projecting upwardly from the top of the sled 27. The adjustment is such that the idle limit switch 113 will be opened when the engine is slowed to the minimum operable speed at top altitude (approximately 5,000 R. P. M. in the TG-180), and the roller can ride over the boss 120 when the sled 27 moves from the idling position to the fully closed position of the throttle, where the retard limit switch 112 will be opened.

The retard 112, and idle 113, limit switches are connected in series in the retard circuit and their functions are controlled as follows: when the engineer's master control switch 110 or the pilot switch 101 is operated to retard the throttles, the idle limit switch 113 will control the circuit and stop the throttles at the idling speed of the engines. When a throttle is being retarded by one of the engineer's individual throttle control switches 121, just below described, the idle limit switch 113 is connected to be by-passed, so that the throttles will continue retarding to the closed position as determined by the retard limit switch 112.

The flight engineer is also provided with four individual motor control switches 121 (Figure 1), each one connected to operate a motor 20, subject, however, to a range limitation when the handles 10 are coupled to the torque shaft 12.

Two differential trim limit switches 125 and 126 are mounted on each spring quadrant 72, one under the lower part of each spring segment 70 and 71. These switches are normally closed, one in the retard circuit of the corresponding individual switch 121, the other in the advance circuit thereof.

When all of the four throttle handles 10 are linked to the cams 22 and to torque shaft 12 by engagement of pins 35 in slots 34 and 80 respectively, and one of the individual switches 121 is closed to cause the associated motor to run in a desired direction, one spring segment 70 or 71 of the spring assembly 65 connected to the motor being rotated, will rotate on the spring quadrant 72 until its lower edge operates the plunger of the affected trim limit switch, opening the control circuit and stopping the motor 20. The torque shaft 12 is not rotated, due to the non-operating motor-driven assemblies on the other control systems. However, this does permit limited movement of the individual throttle handle 10, and connected engine throttle, without movement of the other handles, for trimming the individual motors.

This provision makes it possible for the flight engineer to advance or retard the speed of any one engine relative to the other by an amount preferably not less than 5% of the maximum engine R. P. M. at full throttle position, so that all engines may be trimmed to the same R. P. M. The advance differential trim limit switch 125 and retard differential trim limit switch 126 are respectively connected in series with the advance limit switch 111 and retard limit switch 112 operated by sled 27. When the engineer's master control switch 110 is operated, the differential trim limit switches 125 and 126 will not be operated since the torque shaft 12, and hence the spring quadrant 72 on which the subject switches are mounted, will be rotated under the combined action of the springs 76 at all throttle handles 10. Under these conditions, with all handles coupled through the torque shaft 12, the flight engineer's master switch 110 can advance all the engines to full advance, but can only retard the throttles to the idle limit as determined by the position of the idle limit switches 113 as they are in the master switch circuit. In order for the flight engineer to electrically throttle below altitude idling speed he must operate all four of the individual switches 121 evenly so that none of the trim limit switches are operated. Mechanically, however, the flight engineer can go below idling throttling speed by disconnecting the motors and throttle by hand by use of one of the throttle handles provided they are all still connected to the torque shaft with the motors disengaged as by operation of the pilot's disengagement lever 85, or by manual operation of each individual throttle handle when pins 35 are disengaged, as in a shut-down procedure.

Pilot advance and retard control switches 100 and 101 operate exactly as the flight engineer's master switch, the pilot being unable by the use of these switches to go below altitude idling speed. However, it is made possible for the pilot to bypass the idle limit switches and at the same time speed up motor operation for landing procedures.

This is accomplished by providing the pilot with a high speed button 125, shown in Figure 4, on each pilot handle 40. This high speed button, when pressed in conjunction with the closure by the pilot of one or the other of the advance and retard switches 100 or 101, is connected to bypass the idle limit switches 113 and at the same time to bypass one of two armature windings on each motor 20, making these motors run three times as fast as normal. Such high speed operation of the throttles is only to be used at lower altitudes where faster throttle rates and lower idling speeds can be tolerated, as for example, for landing procedures, and in the system described can only be accomplished by the pilot. If desirable, however, the flight engineer can also be provided with a high speed switch.

In the operation of the TG-180 turbo-jet engine, for example, it has been pointed out that the R. P. M. is substantially linear with the engine throttle shaft angle. In one particular embodiment of the throttle system as described herein, the movement of the flight engineer's handle knob is very close to being linear with engine R. P. M. However, the maximum allowable rates at which the engines can be accelerated or decelerated differ at different altitudes and at different R. P. M. In broad terms, the engine can be safely accelerated faster at sea level than at higher altitudes, and faster at speeds approaching maximum R. P. M.

These requirements are met in the particular system described by providing a normal rate of engine throttle movement corresponding to the safe allowable rates at 40,000 ft. altitude or below for example, and then connecting the pilot's high speed button to run the throttles controlling motors at safe allowable rates corresponding to an altitude of 10,000 ft. or below. This high speed throttle operation permits rapid electrical run-up of the engines to full R. P. M. prior to take-off, or in the event of a balked landing. The ordinary landing procedure may also require the maximum allowable rate of motion in retarding the throttle. As all landings and take-offs will generally be below 10,000 ft. the pilot's high speed control of the motors can be safely used for these operations. As another requirement is that acceleration from 50% thrust to full thrust should take place in not more than four seconds, the cam is designed to provide, even at normal speed of rotation, a faster operation of the engine throttles from 50% thrust to full thrust than from idling thrust to 50% thrust. This controlled variation in rate, plus the ability of the pilot to increase the speed of cam rotation by speeding up motors 20 provides the desired four second thrust range for balked landings when the throttles are cam controlled.

In a particular illustrative example of the present invention, the flight engineer's handle knobs can be give maximum allowable high speed velocities for use under 10,000 ft. with motors 20 under control of the pilot's high speed button, in inches per second as follows:

| In./sec. | |
|---|---|
| .081 | 2000 R. P. M. |
| .198 | |
| .335 | |
| .635 | |
| .977 | |
| 1.033 | |
| 1.162 | |
| 1.246 | |
| 1.435 | |
| 1.593 | |
| 1.933 | |
| 2.548 | |
| 3.693 | 7600 R. P. M. |

For normal throttle handle control by motors 20, the rates will, of course, be one third of the above, as determined by use of the flight engineer's master switch 110 and the pilot's advance and retard control switches 100 and 101.

It can thus be clearly seen that the present invention will provide safe throttle rates at all times, and still will permit throttle rates suitable for take-offs, landings or balked landings under the flight engineer's and/or pilot's control, with complete direct manual operation made available to both in case of emergencies, or failure of the electricity supply.

To reduce backlash to a minimum, in view of the high sensitivities involved, the throttle control system connecting medium between the engines and flight engineer's control handles is preferably composed of a maximum cable length and a minimum number of actuating rod joints. This also applies to the follow-up system between the pilot's control handle and the flight engineer's station. To obtain minimum backlash in the necessary rod joints, selective fits should be used for all pins or bolts in holes held to close tolerances. When this is done, the total system backlash, including internal engine throttle parts, during motor-driven operation of one particular system amounted to approximately 0.23 inch movement of flight engineer's control handle knob, the handle length being 11 inches. At flying speed position of the flight engineer's control handles, this linear backlash is equivalent to approximately one-half degree angular backlash of the engine throttle control shaft. The lost motion in the pilot's handle is slightly greater, being on the order of .32 inch of knob travel when motor driven. These figures represent substantially the lowest backlash that can practically be obtained in a system of the type and size described.

A throttle system substantially as described herein has been found eminently satisfactory under all ground and flight conditions for controlling eight TG-180 General Electric jet engines, mounted four on each side of the centerline of the large all-wing U. S. Army bomber known as the YB-49. The flight engineer, of course, is provided with two systems as described herein, one for the four engines on each side of the airplane, and the pilot with two handles, one for the set of engines in the left hand wing and one for the set of engines in the right hand wing. On the basis of switching characteristics, motor brake performance and other pertinent factors a maximum value for minimum increment of speed in the critical region of about 7.5 M. P. H. is obtained.

From the above description it will be seen that the characteristics of the control system of the present invention have been made acceptable to the peculiar demands of the jet engine-airplane combination, with a proper safeguard for all conditions to be expected in airplane operation. No excessive tailpipe temperatures or turbine blade damage due to too rapid throttle advance takes place, and burner blowouts due to too rapid throttle retard are avoided. In addition, the throttle sensitivity is such that airplanes so equipped are able to fly in formation without the necessity of extending flap surfaces to obtain small speed adjustments.

What is claimed is:

1. In combination with an airplane driven by a plurality of turbo-jet engines having engine throttles varying their R. P. M. substantially linearly with change in throttle shaft angle, a torque shaft, a manually operated throttle handle directly connected to each engine throttle and mounted to rotate freely on said torque shaft, a reversible electric motor for each of said handles. each connected to rotate a cam having a rate controlling groove thereon, a cam follower in said groove, a driving arm mounted to rotate freely on said torque shaft adjacent each of said handles, each of said arms being connected to a cam follower to be rotated thereby, a connection to said torque shaft adjacent each of said handles, and means on each of said handles to engage and disengage said handles with the respective adjacent arm and torque shaft connection, and a switch adjacent said handles to operate all said motors simultaneously to move all of said handles in unison with said torque shaft when engaged with said arms, said torque shaft being adapted to make operating connection with separate driven means.

2. Apparatus in accordance with claim 1 wherein each of said torque shaft connections are radially elastically connected within predetermined limits to said torque shaft.

3. Apparatus in accordance with claim 1, wherein each of said torque shaft connections are radially elastically connected within predetermined limits to said torque shaft, and wherein individual motor switches are provided to separately operate each motor within the limits of said elastic connection.

4. Apparatus in accordance with claim 1 wherein a single throttle handle is provided at a remote location rotationally connected to said torque shaft and wherein a second switch in parallel with said motor operating switch is positioned on said single handle.

5. Apparatus in accordance with claim 1 wherein a single throttle handle is provided at a remote location rotationally connected to said torque shaft and wherein a second switch in parallel with said motor operating switch is positioned on said single handle, and wherein a driving arm disengaging means is positioned adjacent said single handle, movable to disengage only said driving arms from the handles mounted on said torque shaft, whereby said single handle can manually rotate all of the handles mounted on said torque shaft and their connected throttles through said torque shaft and torque shaft connections.

6. In combination with an airplane driven by a plurality of turbo-jet engines having engine throttles varying their R. P. M substantially linearly with change in throttle shaft angle, a torque shaft, a manually operated throttle handle directly connected to each engine throttle and mounted to rotate freely on said torque shaft, a reversible electric motor for each handle connected to rotate a cam having a rate controlling groove thereon, a cam follower in each of said grooves, a driving arm mounted to rotate freely on said torque shaft on one side of each of said handles, each of said arms being connected to a cam to be rotated thereby, a torque shaft connection on the other side of each handle and resiliently attached to said torque shaft for a limited amount of rotation with respect to said torque shaft, means mounted on each of said handles to engage and disengage said handles with the respective adjacent driving arms and torque shaft connections, a master switch for simultaneously energizng all of said motors to run in the same direction, and individual switches for operating individual motors in either direction when said torque shaft connections are engaged, within said limited amount of rotation thereof with respect to said torque shaft.

7. Apparatus in accordance with claim 6 wherein limit switches are positioned at the limits of rotation of each of said torque shaft connections to break the circuit of the respective individual switch being operated.

8. Apparatus in accordance with claim 7 wherein limit switches are positioned at the limits of rotation of each of said torque shaft connections to break the circuit of the respective individual switch being operated said limited movement permitting an individual throttle movement of each handle of about 5% of the full R. P. M. of the turbo-jet engine being controlled by said handle.

9. Apparatus in accordance with claim 6 wherein each of said cam followers are positioned to actuate a separate full advance limit switch, and a full retard limit switch to open the associated motor energization circuit at each end of the cam follower path, and wherein an idling position switch is positioned to be operated by said cam follower movement at a position corresponding to a safe jet engine idling speed, said idling position switches being connected to be operative to break the associated motor control circuit when energized by said master switch, but to be inoperative when the associated motor is energized by an individual switch.

10. Apparatus in accordance with claim 6 wherein each of said cam followers are positioned to actuate a separate full advance limit switch, and a full retard limit switch to open the associated motor energization circuit at each end of the cam follower path, and wherein an idling position switch is positioned to be operated by said cam follower movement at a position corresponding to a safe jet engine idling speed, said idling position switches being connected to be operative to break the associated motor control circuit when energized by said master switch, but to be inoperative when the associated motor is energized by an individual switch, and wherein a separate throttle handle is positioned at a remote location and mechanically connected to rotate with said torque shaft, a separate handle switch on said separate handle connected in parallel with said master switch, and a high speed switch on said handle connected to operate said motors at a speed higher than the speed provided by operation of said master switch.

11. Apparatus in accordance with claim 6 wherein each of said cam followers are positioned to actuate a separate full advance limit switch, and a full retard limit switch to open the associated motor energization circuit at each end of the cam follower path, and wherein an idling position switch is positioned to be operated by said cam follower movement at a position corresponding to a safe jet engine idling speed, said idling position switches being connected to be operative to break the associated motor control circuit when energized by said master switch, but to be inoperative when the associated motor is energized by an individual switch, and wherein a separate throttle handle is positioned at a remote location and mechanically connected to rotate with said torque shaft, a separate handle switch on said separate handle connected in parallel with said master switch, and a high speed switch on said handle connected to operate said motors at a speed higher than the speed provided by operation of said master switch, and means positioned adjacent said separate handle for disengaging only said driving arms from the handles on said torque shaft whereby said separate handle can rotate all of said latter handles and connected engine throttles through said torque shaft and said shaft connections.

THOMAS A. FEENEY.
CHARLES E. OATES.
ALVIN R. VOGEL.

REFERENCES CITED

The following references are of record in the file of this patent:

UNITED STATES PATENTS

| Number | Name | Date |
|---|---|---|
| 1,089,478 | Kasley | Mar. 10, 1914 |
| 1,139,901 | Pitts | May 18, 1915 |
| 1,641,567 | Bailing | Sept. 6, 1927 |
| 1,858,624 | Hess | May 17, 1932 |
| 1,889,295 | Rosatelli | Nov. 29, 1932 |
| 2,011,651 | Puffer | Aug. 20, 1935 |
| 2,066,819 | Berry | Jan. 5, 1937 |
| 2,071,177 | Puffer | Feb. 16, 1937 |
| 2,289,654 | Keel | July 14, 1942 |
| 2,323,737 | Tritle | July 6, 1943 |
| 2,330,388 | Scott-Paine | Sept. 28, 1943 |